United States Patent
Wang et al.

(10) Patent No.: US 11,805,025 B1
(45) Date of Patent: Oct. 31, 2023

(54) NEURAL NETWORK COMPUTING-ORIENTED MODELING METHOD AND APPARATUS FOR DISTRIBUTED DATA ROUTING

(71) Applicant: ZHEJIANG LAB, Hangzhou (CN)

(72) Inventors: Hongsheng Wang, Hangzhou (CN); Shuibing He, Hangzhou (CN); Hujun Bao, Hangzhou (CN); Guang Chen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/848,048

(22) Filed: Jun. 23, 2022

Related U.S. Application Data

(63) Continuation of application No. PCT/CN2022/092482, filed on May 12, 2022.

(30) Foreign Application Priority Data

Apr. 28, 2022 (CN) .......................... 202210455426.0

(51) Int. Cl.
*G06F 8/41* (2018.01)
*H04L 41/14* (2022.01)
(Continued)

(52) U.S. Cl.
CPC ............ *H04L 41/145* (2013.01); *H04L 41/16* (2013.01); *H04L 45/44* (2013.01)

(58) Field of Classification Search
CPC ........ G06F 17/16; G06F 8/433; G06F 9/5066; G06N 3/08; G06N 3/02
See application file for complete search history.

(56) References Cited

U.S. PATENT DOCUMENTS 11,520,856 B2 * 12/2022 Baskaran ................ G06F 17/16
11,645,057 B2 * 5/2023 Koeplinger ............ G06F 8/433
716/110

(Continued)

FOREIGN PATENT DOCUMENTS

CN 112799852 A 5/2021
CN 113128702 A 7/2021
(Continued)

*Primary Examiner* — Mansour Oveissi
(74) *Attorney, Agent, or Firm* — IPRO, PLLC

(57) ABSTRACT

The present disclosure provides a neural network computing-oriented modeling method and apparatus for distributed data routing. The method includes the following steps: S1, designing the distributed attribute of a physical tensor: abstracting a mapping relationship between a logic tensor and the physical tensor into three distributed attributes including a broadcast attribute, a scatter attribute and a local reduction attribute; S2, deducing the distributed attribute of an output tensor: specifying the distributed attribute of an input tensor, and then deducing the legal distributed attribute of the output tensor according to the known distributed attribute of the input tensor; and S3, judging, according to the distributed attribute situation, whether an intermediate communication primitive needs to be inserted to obtain the distributed attribute of a local physical tensor. The difficulty of distributed design and development is low, and the development of application of a deep neural network large model is promoted.

10 Claims, 10 Drawing Sheets

(51) Int. Cl.
  *H04L 45/44* (2022.01)
  *H04L 41/16* (2022.01)

(56) References Cited

U.S. PATENT DOCUMENTS

| | | |
|---|---|---|
| 2020/0042856 A1 | 2/2020 | Datta et al. |
| 2022/0051104 A1 | 2/2022 | Interlandi et al. |
| 2022/0284263 A1* | 9/2022 | Jung .................. G06N 3/04 |

FOREIGN PATENT DOCUMENTS

| | | |
|---|---|---|
| CN | 113179660 A | 7/2021 |
| CN | 113313241 A | 8/2021 |
| CN | 113449857 A | 9/2021 |
| CN | 113994350 A | 1/2022 |
| CN | 114186633 A | 3/2022 |
| CN | 114186687 A | 3/2022 |
| WO | 2021190127 A1 | 9/2021 |

* cited by examiner

NEURAL NETWORK COMPUTING-ORIENTED MODELING METHOD AND APPARATUS FOR DISTRIBUTED DATA ROUTING

CROSS-REFERENCE TO RELATED APPLICATION

The present disclosure claims the benefit of priority to Chinese Application No. 202210455426.0 filed on Apr. 28, 2022 to China National Intellectual Property Administration and entitled "Neural Network Computing-Oriented Modeling Method and Apparatus for Distributed Data Routing", of which is incorporated herein by reference in its entirety.

FIELD

The present disclosure relates to the field of computer systems based on specific computation models, in particular to a neural network computing-oriented modeling method and apparatus for distributed data routing.

BACKGROUND

With the rapid development of industrialization application of artificial intelligence, a distributed training system of a large-scale deep neural network model becomes a research hotspot in academic circles and industrial circles. An existing deep learning compiler lacks a uniform distributed routing strategy in the process of deploying tensor data generated by all logic computation graphs to physical computation graphs of different device processes when compiling a distributed neural network model.

SUMMARY

The present disclosure aims to provide a neural network computing-oriented modeling method and apparatus for distributed date routing, so as to overcome shortcomings in the prior art.

In order to achieve the above purpose, the present disclosure provides the following technical solutions.

The present disclosure discloses a neural network computing-oriented modeling method for distributed data routing, including the following steps:

S1: designing a distributed attribute of a physical tensor: abstracting a mapping relationship between a logic tensor and the physical tensor into three distributed attributes including a broadcast attribute, a scatter attribute and a local reduction attribute;

S2: deducing a distributed attribute of an output tensor: specifying the distributed attribute of an input tensor, and then deducing the legal distributed attribute of the output tensor according to the known distributed attribute of the input tensor;

S3: judging, according to the distributed attribute situation, whether an intermediate communication primitive needs to be inserted to obtain the distributed attribute of a local physical tensor;

S4: deducing the type of the intermediate communication primitive, specifically including the following sub-steps:

S41: deducing the distributed attribute of the output tensor of a producer operator: deducing the legal distributed attribute of the output tensor according to the distributed attribute of the input tensor of the producer operator;

S42: deducing the intermediate communication primitive: deducing the required type of the intermediate communication primitive according to the distributed attribute of the output tensor of the producer operator and the distributed attribute of the input tensor required by a consumer operator;

S5: deducing transmission cost of the intermediate communication primitive: deducing communication cost of conversion between different distributed attributes;

S6: deducing the modeling mode of the intermediate communication primitive, including the following sub-steps:

S61: defining basic atomic operations;

S62: constructing a complex operation: wherein the complex operation is formed by composing the basic atomic operations;

the complex target operation is constructed by using an OR mode, and the obtained target operation is a parallel relationship of a plurality of atomic operations;

the complex operation is constructed by using a divide and conquer mode, and the obtained target operation is a series relationship of the plurality of atomic operations by means of an intermediate distributed attribute; and the complex operation is constructed by using a composition mode, and the composition mode refers to constructing a more complex target operation by combined use of series and parallel modes; and S7: inserting an intermediate communication primitive with the minimum transmission cost: selecting a primitive with the lowest transmission cost, and inserting the primitive with the minimum transmission cost into a space between a global logic tensor and the local physical tensor.

Preferably, in the step S1: the broadcast attribute refers to sending data of the logic tensor to other nodes in a cluster; wherein the scatter attribute refers to dividing the data of the logic tensor along a specified dimension and scattering the data to other nodes, and the scatter attribute of a tensor component obtained by splitting along a horizontal axis is defined as $S(0)$, and the scatter attribute of a tensor component obtained by splitting along a vertical axis is defined as $S(1)$; and the local reduction attribute reflects components of different logic tensors being distributed to a physical device process for computing, the local physical tensor obtained by computing is a partial value of a global logic tensor obtained by computing a complete tensor before the different logic tensors are split, the local physical tensor is consistent with the global logic tensor in shape, and the global logic tensor may be obtained by performing element-by-element reduction operation on the local physical tensor obtained by computing all the logic tensor components.

Preferably, the specific process of the step S3 is as follows: with regard to adjacent operators having a production-consumption relationship, if the distributed attribute, generated by the producer operator, of the same logic tensor is different from the distributed attribute required by the consumer operator, the intermediate communication primitive is required to be inserted between the producer operator and the consumer operator of the logic tensor, otherwise, the intermediate communication primitive is not required to be inserted between the producer operator and the consumer operator of the logic tensor.

Preferably, the step S5 includes the following specific sub-steps:

S51: deducing communication cost of conversion of the scatter attribute into any distributed attribute, the communication cost including the following types:

communication cost of conversion between the scatter attribute S(0) and the scatter attribute S(1): conversion between the two different scatter attributes is realized by means of an intermediate communication primitive All2All, and transmission data volume generated in the process of conversion between devices is the size of the global logic tensor;

communication cost of conversion of the scatter attribute to the broadcast attribute: the scatter attribute is converted into the broadcast attribute by means of an intermediate communication primitive AllGather, and the communication cost is the product of the number of device processes of the output tensor and the size of the global logic tensor;

S52: deducing communication cost of conversion of the local reduction attribute into any distributed attribute, the communication cost including the following types:

communication cost of conversion of the local reduction attribute into the scatter attribute: the local reduction attribute is converted into the scatter attribute by means of an intermediate communication primitive ReduceScatter, and the communication cost is the product of the number of device processes of the input tensor and the size of the global logic tensor; and communication cost of conversion of the local reduction attribute into the broadcast attribute: the local reduction attribute is converted into the broadcast attribute by means of an intermediate communication primitive AllReduce, the communication cost is $(p_1-1+p_2)*|T|$, wherein $p_1$ is the number of device processes containing the input tensor, $|T|$ is the size of a logic tensor T, and $p_2$ is the number of device processes containing the output tensor.

Preferably, in the step S5: with regard to the circumstance that the broadcast attribute of the input tensor is converted into the scatter attribute of the output tensor of the intermediate communication primitive, the output tensor may directly acquire data from the input tensor located on the same device, and therefore, the transmission cost of the intermediate communication primitive in the circumstance is 0.

Preferably, the step S61 includes the following specific sub-steps:

S611: defining an atomic operation of conversion between the scatter attribute S(0) and the scatter attribute S(1) as a communication primitive All2All;

S612: defining an atomic operation of conversion of the scatter attribute into the broadcast attribute as a communication primitive AllGather;

S613: defining an atomic operation of conversion of the local reduction attribute into the scatter attribute as a communication primitive ReduceScatter;

S614: defining an atomic operation of conversion of the local reduction attribute into the broadcast attribute as a communication primitive AllReduce;

S615: defining an atomic operation of conversion of a distributed attribute X into the same distributed attribute X as Identity, wherein the operation of Identity is a copy operation which represents copying of the input tensor to the output tensor; and S616: defining an atomic operation of deploying the global logic tensor into a 12P local physical distributed relationship: deploying the global logic tensor into different device processes, wherein the physical tensor contained in one device process is a copy of the global logic tensor, and the other device processes only contain physical tensors of which the shapes are consistent with the shape of the global logic tensor and numerical values are all set to zero.

Preferably, the specific mode of constructing a complex target operation by using an OR mode is as follows:

target operation $X2W$=(atomic operation $I2W$)| (atomic operation $O2W$);

wherein a deducing result of the target operation X2W is met, if the distributed attribute of the input tensor and the distributed attribute of the output tensor conform to a distributed attribute deducing result of any one of the atomic operation I2W and the atomic operation O2W; wherein X represents any one distributed attribute, X may be replaced by another distributed attribute, W represents a certain specified distributed attribute, I represents an input distributed attribute, O represents an output distributed attribute, 2 represents a process of conversion between distributed attributes, and X2W represents conversion of the distributed attribute X into the distributed attribute W.

Preferably, the specific mode of constructing the complex operation by using a divide and conquer mode includes:

target operation I2O=divide and conquer (atomic operation I2W, atomic operation M2O);

wherein the target operation I2O may be in series with the two atomic operations I2M and M2O by using a distributed attribute M in an intermediate state, if the distributed attribute I of the input tensor and the intermediate distributed attribute M conform to a distributed attribute deducing result of the atomic operation I2M, and the intermediate distributed attribute M and the distributed attribute O of the output tensor conform to a distributed attribute deducing result of the atomic operation M2O, then the deducing result of the distributed attribute of the target operation I2O is met; wherein I represents an input distributed attribute, O represents an output distributed attribute, and 2 represents a process of conversion between the distributed attributes.

Preferably, the specific mode of the step S7 includes: acquiring routing operations of different deducing distributed attributes based on the above-mentioned steps, selecting the operation with the minimum communication cost from all the routing operations as a final routing modeling method for deducing the required distributed attribute of the local physical tensor, and finally inserting the intermediate communication primitive corresponding to the selected method into a space between the global logic tensor and the local physical tensor.

The present disclosure further discloses a neural network computing-oriented modeling apparatus for distributed data routing, including a memory and one or more processors, the memory stores an executable code, and the one or more processors, when executing the executable code, is used for implementing the neural network computing-oriented modeling method for distributed data routing.

The present disclosure has the beneficial effects that: in the present invention, firstly, it designs the distributed attribute of the physical tensor, where the global logic tensor is mapped to different device processes, and sets different distributed attributes for customizing a parallel strategy for different computation subgraphs of a neural network model, so as to meet the needs that a user can flexibly carry out distributed training and debugging, and to obtain the local optimal solution of a distributed model; secondly, it constructs a modeling method for distributed data routing in a process of deploying a global logic tensor to local physical tensors of different device processes; and finally, it selects an intermediate communication primitive with the minimum communication cost generated by the distributed data routing method, and inserts the primitive into a space between the global logic tensor and the local physical tensor, and obtains distributed attributes required by local physical tensors on the different device processes. In the process of developing the distributed model by researchers and engineering applicators, the neural network computing-oriented modeling method and apparatus for distributed data routing are used for building a model, the difficulty of distributed design and development is low, and the development of the application of a deep neural network large model is promoted.

DETAILED DESCRIPTION OF THE EMBODIMENTS

In order to make the objects, technical solutions and advantages of the present disclosure more apparent, the present disclosure will be further described in detail below with reference to the accompanying drawings and embodiments. However, it should be understood that the described specific embodiments herein are only intended to illustrate the present invention but not to limit the scope of the present invention. Moreover, in the following illustration, descriptions of known structures and known art are omitted so as to not unnecessarily obscure the concepts of the present invention.

An embodiment of the present disclosure provides a neural network computing-oriented modeling method for distributed data routing, and provides a dynamic graph execution method for neural network model computation in a deep learning training system. The modeling method oriented neural network computation for distributed data routing includes three main processes: designing the distributed attribute of a physical tensor, modeling of a distributed data routing method, and automatic inserting of a distributed data routing operator.

Figure 1:
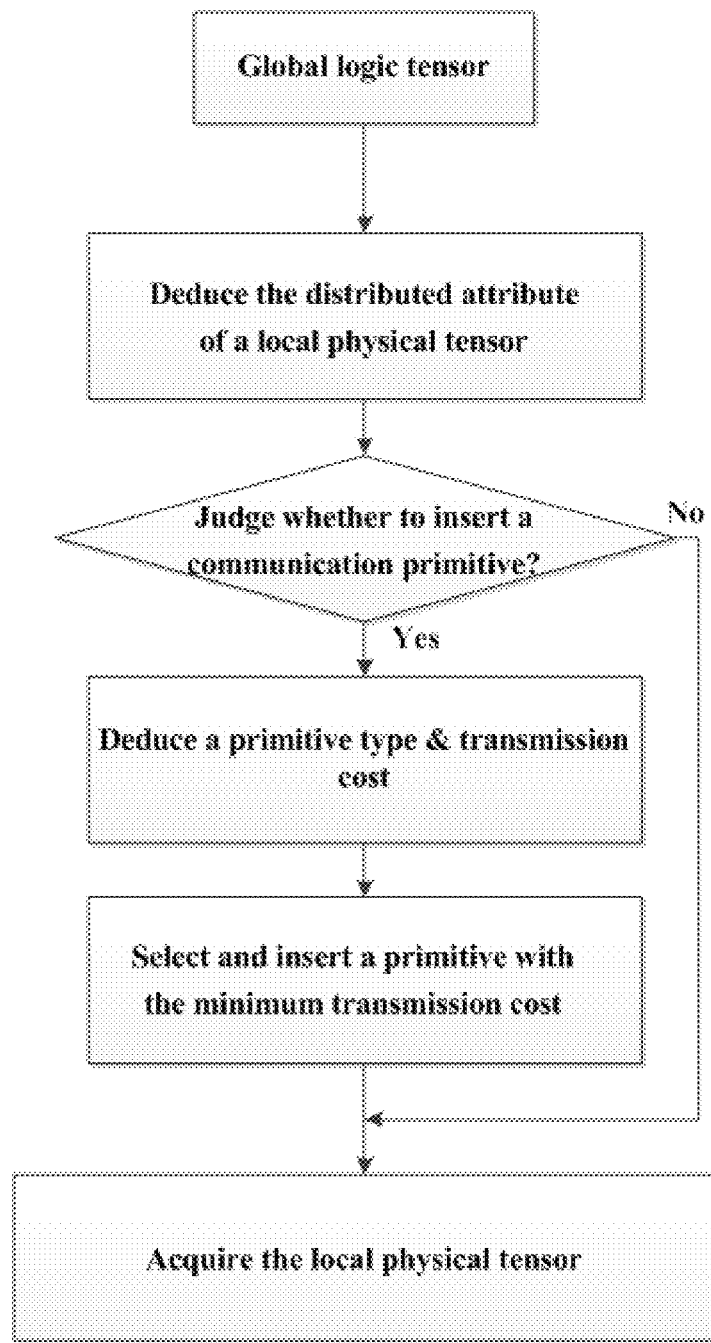
FIG. 1 is a modeling flow of distributed data routing for neural network computation.

As shown in FIG. 1, an embodiment of the present disclosure provides a neural network computing-oriented modeling method for distributed data routing, including that: deducing distributed attributes of local physical tensors on various device processes according to the distributed attribute of an input global logic tensor, judging whether it needs an intermediate communication primitive to obtain the distributed attributes of the local physical tensors, if the intermediate primitive needs to be inserted deducing the type and transmission cost of the intermediate primitive selecting a primitive with the minimum transmission cost, and inserting the primitive in a space between the global logic tensor and the local physical tensors to obtain the distributed attributes of the local physical tensors; and if the intermediate primitive does not need to be inserted, directly deducing the distributed attributes of the local physical tensors according to the distributed attribute of the global tensor. The specific process is as follows:

S1: designing the distributed attribute of a physical tensor;
S2: deducing the distributed attribute of an output tensor;
S3: judging whether an intermediate communication primitive needs to be inserted to obtain the distributed attribute of a local physical tensor;
S4: deducing the type of the intermediate communication primitive;
S5: deducing the transmission cost of the intermediate communication primitive;
S6: deducing the modeling mode of the intermediate communication primitive; and
S7: inserting the intermediate communication primitive with the minimum transmission cost.

In the step S2, the distributed attributes of the physical tensor include a broadcast attribute, a scatter attribute and a local reduction attribute, and designing includes the following processes:

abstracting the mapping relationship between the logic tensor and the physical tensor into three distributed attributes.

(1) designing the broadcast attribute. The broadcast attribute refers to sending data of the logic tensor to other nodes in a cluster, and then the broadcast attribute may be used. The physical tensor on each device process is a copy of the logical tensor. The broadcast attribute is denoted as B.

(2) designing the scatter attribute. The scatter attribute refers to dividing the data of the logic tensor along a specified dimension and scattering the data to other nodes. The scatter attribute of a tensor component obtained by splitting along a horizontal axis is defined as S(0); the scatter attribute of a tensor component obtained by splitting along a vertical axis is defined as S(1). The actual physical tensor on each device process is obtained by splitting the logical tensor along a specified dimension. The scatter attribute is very similar to the broadcast attribute, and both the scatter attribute and the broadcast attribute are in a one-to-many communication mode, and the difference is that the logical tensor of the broadcast attribute sends the same data to the physical device processes of all nodes, while the logic tensor of the scatter attribute sends different parts of the data to the physical device processes of different nodes as required.

(3) designing the local reduction attribute. The local reduction attribute reflects components of different logic tensors being distributed to a physical device process for computing, the local physical tensor result obtained by computing is a partial value of a global logic tensor obtained by computing the complete tensor before the different logic tensors are split, the local physical tensor result is consistent with a global logic tensor result in shape, and the global logic tensor result may be obtained by performing element-by-element reduction operation on the local physical tensor result obtained by computing all the logic tensor components. The local reduction attribute is denoted as P.

Figure 2:
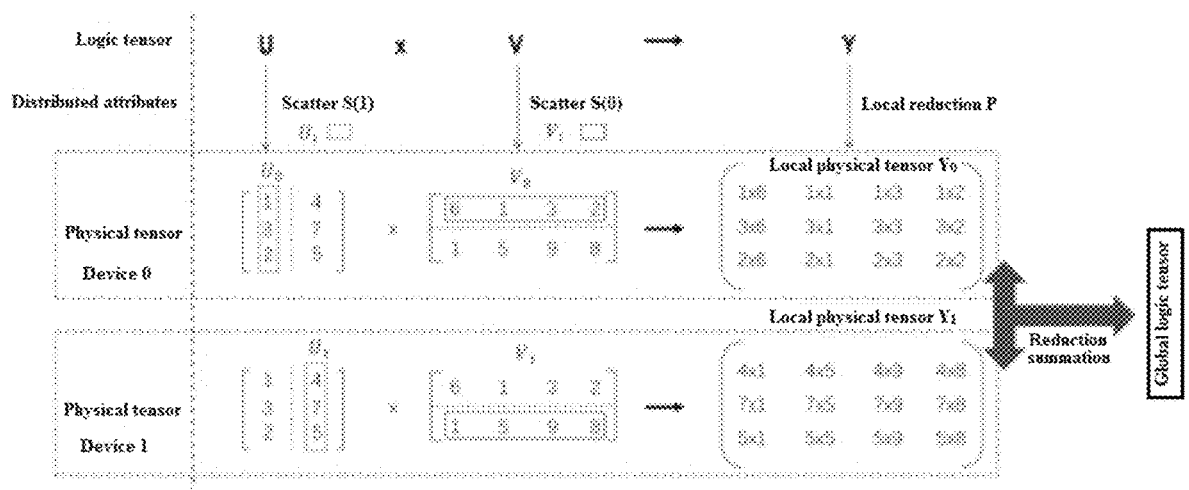
FIG. 2 is a schematic diagram of a local reduction attribute.

According to the local reduction attribute as shown in FIG. 2, a device process 0 contains a component $U_0$ of a logical tensor U with a scatter attribute S(1) and a component $V_0$ of a logic tensor V with a scatter attribute S(0), and the physical tensors $U_0$ and $V_0$ on the device process 0 are used for computing to obtain a local physical tensor $Y_0$. Similarly, physical tensors $U_1$ and $V_1$ on a device process 1 are acquired, and then computing is carried out to obtain a local physical tensor $Y_1$. The logical tensors U and V are used for computing to obtain a global logic tensor Y. The local physical tensors $Y_0$ and $Y_1$ are subjected to reduce summation, so that the global logic tensor Y may be obtained. Moreover, the shapes of the local physical tensors $Y_0$ and $Y_1$ are the same as the shape of the global logic tensor Y.

In the step S2, the distributed attribute of an input tensor of an operator is known, the distributed attribute of an output tensor is directly deduced according to the attribute of the input tensor, and the specific process is as follows:

S21: specifying the distributed attribute of the input tensor; and

S22: deducing the legal distributed attribute of the output tensor according to the distributed attribute of the input tensor.

For a matrix multiplication operator, as shown in Table 1, all circumstances of the distributed attribute of the input tensor are specified, and the corresponding legal distributed attributes of the output tensor are deduced. The distributed attributes of the input tensor and the output tensor of the operator may particularly specify the parallel strategy of the operator. For the matrix multiplication operator, if an input data tensor X is a scatter attribute S(0) and an input weight tensor W is a broadcast attribute B, it can be deduced that the distributed attribute of the output tensor is the scatter attribute S(0), and it shows that the operator particularly executes a data-parallel distributed strategy; and if the input data tensor X is the broadcast attribute B and the input weight tensor is the scatter attribute S(1), it can be deduced that the distributed attribute of the output tensor is the scatter attribute S(1), and it shows that the operator particularly executes a model-parallel distributed strategy.

TABLE 1

Legal Distributed Attribute of a Matrix Multiplication Operator

| Tensor | Input data tensor X | Input weight tensor W | Output tensor Y = XW |
|---|---|---|---|
| Distributed attribute | S(0) | B | S(0) |
|  | B | S(1) | S(1) |

TABLE 1-continued

Legal Distributed Attribute of a Matrix Multiplication Operator

| Tensor | Input data tensor X | Input weight tensor W | Output tensor Y = XW |
|---|---|---|---|
|  | S(1) | S(0) | P(sum) |
|  | P(sum) | B | P(sum) |
|  | B | P(sum) | P(sum) |
|  | B | B | B | in the step S3, judging whether it requires an intermediate communication primitive to be inserted to obtain the distributed attribute of the local physical tensor: with regard to adjacent operators having a production-consumption relationship, if the distributed attribute, generated by the producer operator, of the same logic tensor is different from the distributed attribute required by the consumer operator, the intermediate communication primitive is required to be inserted between the producer operator and the consumer operator of the logic tensor, otherwise, the intermediate communication primitive is not required to be inserted between the producer operator and the consumer operator of the logic tensor.

Figure 3:
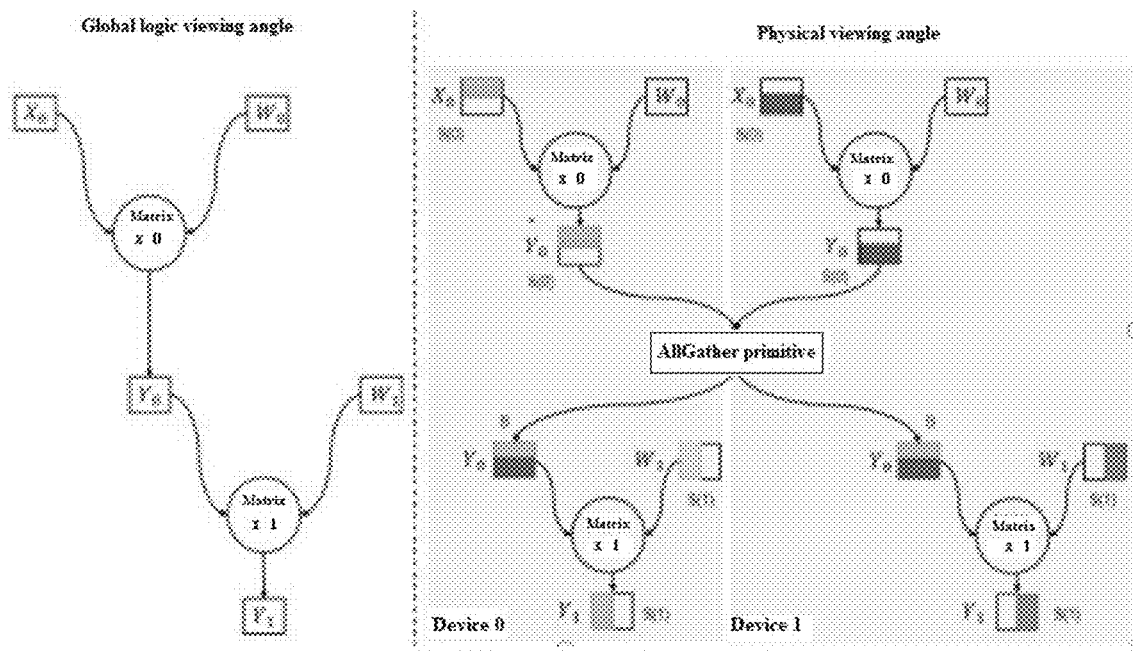
FIG. 3 is a process of inserting an intermediate communication primitive AllGather in a space between matrix multiplication operators having a production-consumption relationship.

The step S4 includes the following specific steps:

S41: deducing the distributed attribute of the output tensor of a producer operator: deducing the legal distributed attribute of the output tensor according to the distributed attribute of the input tensor of the producer operator; and S42: deducing the intermediate communication primitive: deducing the required type of the intermediate communication primitive according to the distributed attribute of the output tensor of the producer operator and the distributed attribute of the input tensor, required by a consumer operator;

FIG. 3 shows that two matrix multiplication operators having production-consumption relationship are respectively deployed on the device process 0 and the device process 1, the distributed attributes of output tensors generated by the producer operator are all scatter attributes S(0), and the distributed attributes of the input tensors expected by the consumer operator are all broadcast attributes B. FIG. 3 demonstrates a process of deducing an intermediate communication primitive AllGather required to be inserted according to the scatter attributes S(0) of the output tensors of the producer operator and the broadcast attributes B of the input tensors expected by the consumer operator. The process for deducing the intermediate communication primitive is as follows: the broadcast attribute B of the input tensor $Y_0$ required by a matrix multiplication 1 of the consumer operator determines that the input tensor required on each device process needs to aggregate data of the output tensors of a matrix multiplication 0 of the producer operator on all the device processes. By the communication primitive AllGather, a plurality of elements may be transmitted to a plurality of device processes. With regard to a group of data distributed to all the device processes, AllGather may gather all data to all the device processes. Therefore, it can be deduced that the type of the intermediate communication primitive is an AllGather operator.

The step S5 of deducing the transmission cost of the intermediate communication primitive includes the following processes: determining the optimal parallel strategy by selecting the distributed attribute of the communication primitive, which causes the lowest transmission cost, since the inserted intermediate communication primitive may cause transmission cost; then, deducing transmission costs under the same-device distributed condition and the cross-device distributed condition respectively when conversion of distributed attributes of the input tensor and the output tensor of the communication primitive is carried out. Conversion of the distributed attributes of tensors between devices always incurs transmission overhead. However, conversion of the distributed attributes of the tensors on the same device may not cause data migration. With regard to the circumstance of converting the broadcast attribute B of the input tensor into the scatter attribute S of the output tensor of the intermediate communication primitive, the output tensor may directly acquire data from the input tensor located at the same device, and therefore, the transmission cost of the intermediate communication primitive in the circumstance is 0.

As shown in Table 2, communication cost of conversion between different distributed attributes is deduced, wherein $p_1$ is the number of device processes containing the input tensor, $p_2$ is the number of device processes containing the output tensor, wherein |T| is the size of a logic tensor T, and 'none' represents zero communication overhead.

TABLE 2

Communication Cost of Conversion between Different Distributed Attributes

| Distributed attribute of a global logic tensor | Distributed attribute 1 → distributed attribute 2 | Intermediate communication primitive | Transmission cost (same device) | Transmission cost (difference devices) |
|---|---|---|---|---|
| S→ | $S_i$→$S_i$ | None | 0 | \|T\| |
|  | $S_i$→$S_j$ | All2All | $\frac{p_1 - 1}{p_1}$\|T\| | \|T\| |
|  | S→B | AllGather | $(p_1 - 1) \cdot$ \|T\| | $p_2 \cdot$ \|T\| |
|  | S→P | None | 0 | \|T\| |
| B→ | B→S | None | 0 | \|T\| |
|  | B→B | None | 0 | $p_2 \cdot$ \|T\| |
|  | B→P | None | 0 | \|T\| |
| P→ | P→S | ReduceScatter | $(p_1 - 1) \cdot$ \|T\| | $p_1 \cdot$ \|T\| |
|  | P→B | AllReduce | $2(p_1 - 1) \cdot$ \|T\| | $(p_1 - 1 + p_2) \cdot$ \|T\| |
|  | P→P | None | 0 | $p_1 \cdot$ \|T\| |

Figure 4:
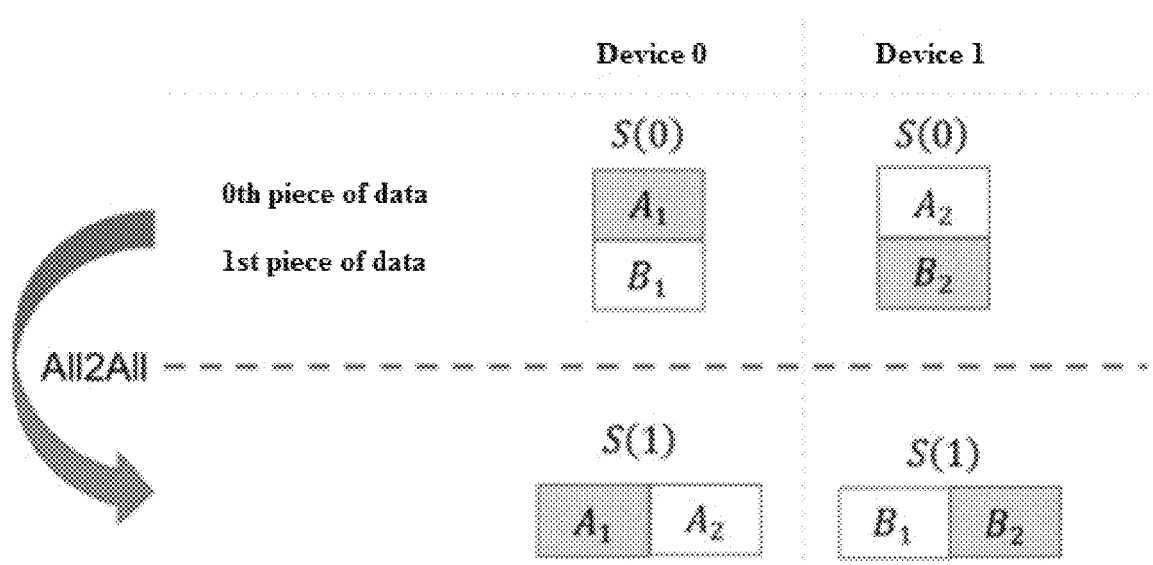
FIG. 4 is a deducing process of an intermediate communication primitive required for converting a scatter attribute $S_i$ into a scatter attribute $S_j$.

The deducing of communication cost of conversion between different distributed attributes includes the following processes:

S51: deducing communication cost of conversion of the scatter attribute into any distributed attribute:

(1) communication cost of conversion of the scatter attribute $S_i$ into the scatter attribute $S_j$. FIG. 4 shows a deducing process of an intermediate communication primitive required for converting the scatter attribute $S_i$ into the scatter attribute $S_j$. The $S_i$ and $S_j$ are respectively S(0) and S(1) or the $S_i$ and $S_j$ are respectively S(1) and S(0). A device 0 contains a tensor which consists of a piece of data $A_1$ and a piece of data $B_1$ and has the scatter attribute S(0), wherein $B_1$ is null data. A device 1 contains a tensor which consists of a piece of data $A_2$ and a piece of data $B_2$ and has the scatter attribute S(0), wherein $A_2$ is null data. $0^{th}$ pieces of data $A_1$ and $A_2$ on the device 0 and the device 1 are sent to the device 0 to obtain a tensor with the scatter attribute S(1) on the device 0; and $1^{st}$ pieces of data $B_1$ and $B_2$ on the device 0 and the device 1 are sent to the device 1 to obtain a tensor with the scatter attribute S(1) on the device 1.

A sending buffer and a receiving buffer of each device process are an array divided into a plurality of data blocks. The specific operation of the communication primitive All2All is as follows: the ith piece of data in the sending buffers of all the device processes (including the device 0 and the device 1) are sent to the receiving buffer of the device process i. Therefore, a conversion process of converting the scatter attribute $S_i$ into scatter attribute $S_j$ may be completed by the intermediate communication primitive All2All, and moreover, the transmission data volume generated in the process of conversion between the device 0 and the device 1 is the size of the global logic tensor.

Figure 5:
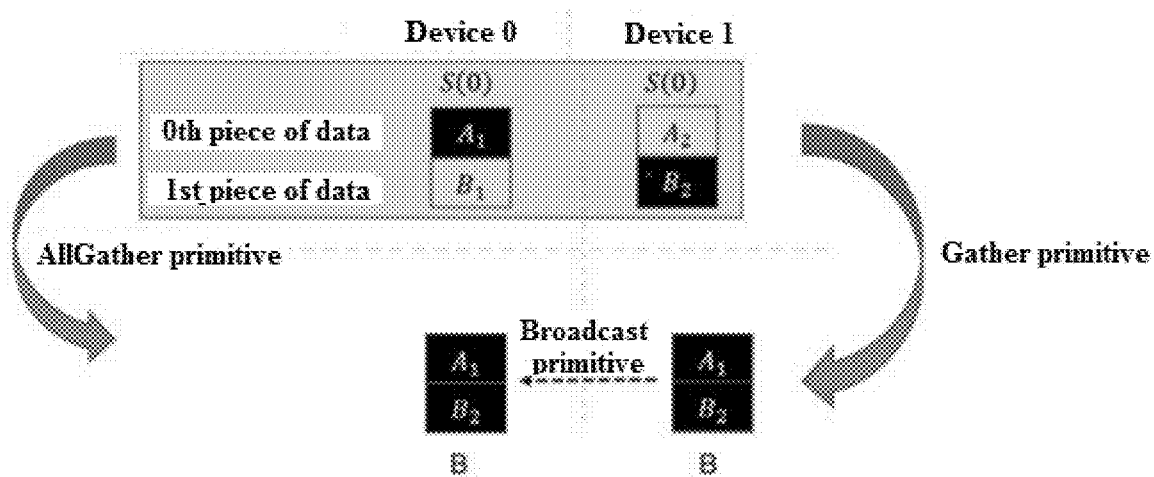
FIG. 5 is a deducing process of an intermediate communication primitive required for converting a scatter attribute S into a broadcast attribute B.

(2) deducing communication cost of conversion of the scatter attribute S into the broadcast attribute B. FIG. 5 shows a deducing process of an intermediate communication primitive required for converting the scatter attribute S into the broadcast attribute B. A data block $A_1$ with the scatter attribute S(0) on the device 0 and a data block $B_2$ with the scatter attribute S(0) on the device 1 are sent to the receiving buffer in the device 1 process. The process may be completed by a communication primitive Gather (Gather primitive). Then data of the receiving buffer in the device 1 process is broadcasted onto the receiving buffer in the device 0 process, and the process may be completed by a communication primitive Broadcast (Broadcast primitive). The whole process may also be completed by one-time operation of a communication primitive AllGather. Moreover, in the last step of the process, the aggregated tensors need to be broadcasted to the receiving buffers of all the output device processes, and therefore, the communication cost of converting the scatter attribute S into the broadcast attribute B is the product of the number of device processes of the output tensor and the size of the global logic tensor.

Figure 6:
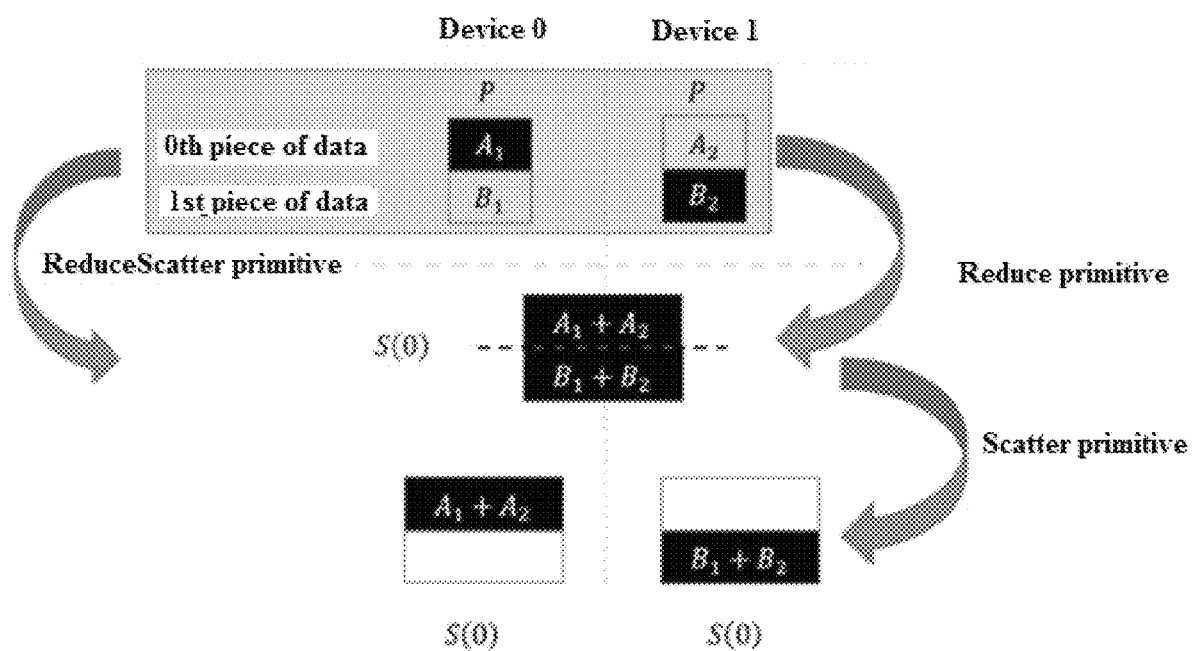
FIG. 6 is a deducing process of communication cost of conversion of a local reduction attribute into a scatter attribute.

S52: deducing communication cost of conversion of the local reduction attribute into any distributed attribute:

(1) communication cost of conversion of the local reduction attribute P into the scatter attribute S. FIG. 6 shows a deducing process of communication cost of conversion of the local reduction attribute into the scatter attribute. Data on the device process 0 and data on the device process 1 are subjected to a reduction operation, then a reduction result is written into the receiving buffer of the specified device process, and the steps may be completed by operation of a communication primitive Reduce. Finally, data in the specified device process is divided, different parts of the data are scattered to the device process 0 and the device process 1, and the steps may be completed by operation of Scatter (Scatter primitive). The whole process may also be completed by one-time operation of a communication primitive ReduceScatter (Reduce-Scatter primitive). When two tensors with the local reduction attribute P in the device 0 process and the device 1 process are subjected to Reduction operation, although the $1^{st}$ piece of data $B_1$ in the device 0 process and the $0^{th}$ piece of data $A_2$ in the device 1 process are null data, the local reduction attribute P determines that the shape of the tensor in each device process keeps consistent with the complete shape of the global logic tensor, and therefore, the communication cost of converting the local reduction attribute P into the broadcast attribute S is the product of the number of the device processes of the input tensor and the size of the global logic tensor.

Figure 7:
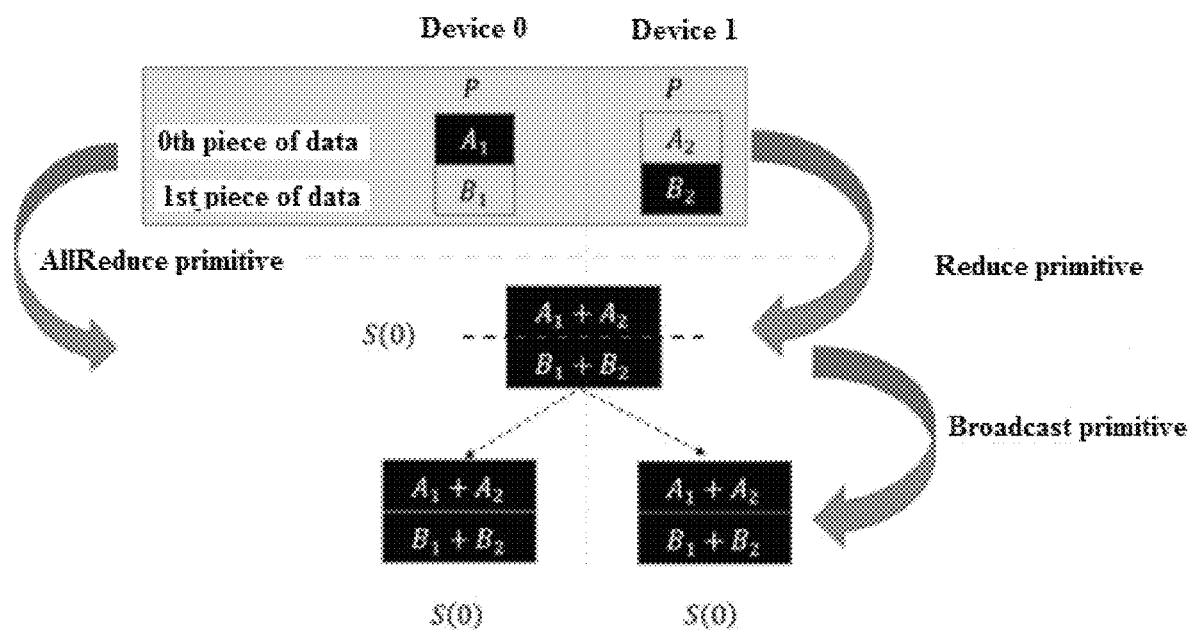
FIG. 7 is a deducing process of communication cost of conversion of a local reduction attribute into a broadcast attribute.

(2) communication cost of conversion of the local reduction attribute P into the broadcast attribute B. FIG. 7 shows a deducing process of communication cost of conversion of the local reduction attribute into the broadcast attribute. The data on the device process 0 and the data on the device process 1 are subjected to reduction operation, then a reduction result is written into the receiving buffer of the specified device process, the steps may be completed by operation of a communication primitive Reduce (Reduce primitive), the transmission cost of data volume with the size of $(p_1-1)*|T|$ is generated, finally, the data in the specified device process is broadcasted to the device process 0 and the device process 1, the steps may be completed by the operation of Broadcast (Broadcast primitive), and the transmission cost of the data volume with the size of $p_2*|T|$ is generated, wherein $p_2$ is the number of the device process containing the output tensor. The whole process may also be completed by one-time operation of a communication primitive AllReduce (AllReduce primitive), and moreover, the transmission cost of the data volume with the size of $(p_1-1+p_2)*|T|$ is generated in all.

The step S6 includes the following process: the expression for deducing the intermediate communication primitive is designed to deduce the type of the intermediate communication primitive, so that a new intermediate communication primitive is added more conveniently, moreover, existing communication primitives may be combined to expand the type of the existing intermediate communication primitive. When a circumstance that the distributed attribute of the input tensor is not consistent with the deduced distributed attribute occurs, it is necessary to convert the distributed attribute of the input tensor into the distributed attribute required for actual deducing by inserting an intermediate primitive.

S61: defining basic atomic operations, including the following sub-steps:

S611: defining an atomic operation of converting the scatter attribute $S_i$ into the scatter attribute $S_j$ as the communication primitive All2All;

S612: defining an atomic operation of converting the scatter attribute S into the broadcast attribute B as a communication primitive AllGather;

S613: defining an atomic operation of converting the local reduction attribute P into the scatter attribute S as a communication primitive ReduceScatter;

S614: defining an atomic operation of converting the local reduction attribute P into the broadcast attribute B as a communication primitive AllReduce;

S615: defining an atomic operation of converting the distributed attribute X into the same distributed attribute X as an Identity, Wherein, because the distributed attribute of the input tensor and the distributed attribute of the output tensor are completely the same, the operation of Identity is a copy operation which represents copying the input tensor to the output tensor; and Table 3 shows the intermediate primitive of the defined basic atomic operations;

TABLE 3

Defining Basic Atomic Operations

| Distributed attribute 1 → distributed attribute 2 | Atomic operations |
|---|---|
| $S_i$ → $S_j$ | All2All |
| S → B | AllGather |

TABLE 3-continued

Defining Basic Atomic Operations

| Distributed attribute 1 → distributed attribute 2 | Atomic operations |
|---|---|
| P → S | ReduceScatter |
| P → B | AllReduce |
| X → X | Identity |

Figure 8:
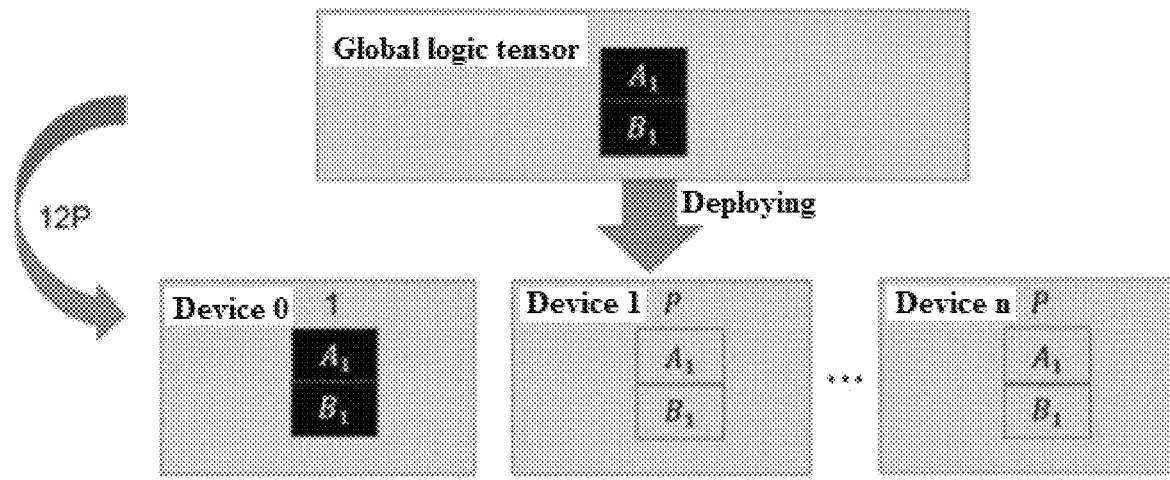
FIG. 8 is an atomic operation of deploying a global logic tensor into a 12P local physical distributed relationship.

S616: defining an atomic operation of deploying the global logic tensor into a 12P local physical distributed relationship: deploying the global logic tensor into different device processes, wherein the physical tensor contained in one device process is a copy of the global logic tensor, and the other device processes only contain physical tensors of which the shapes are consistent with the shape of the global logic tensor but the numerical values are all set to zero. FIG. 8 illustrates an atomic operation of deploying the global logic tensor into the 12P local physical distributed relationship.

Figure 9:
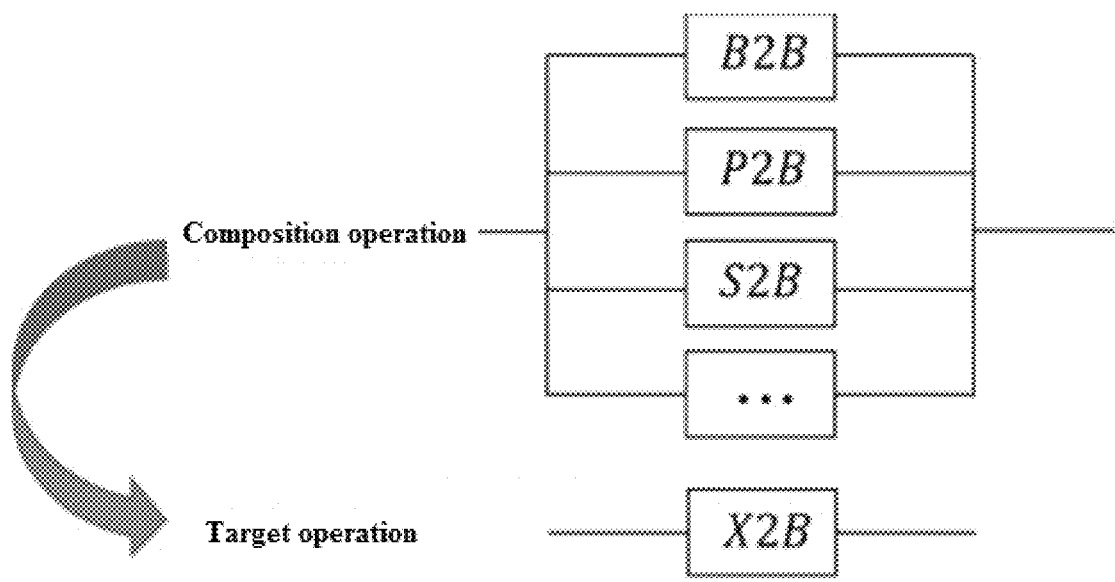
FIG. 9 is a process of constructing a target operation X2B by using an OR ("|") composition operation.

S62: modeling a complex operation. The complex operation is formed by composing the basic atomic operations:

(1) a complex target operation is constructed by utilizing an OR ("|") mode, the OR ("|") mode is defined as follows:

target operation X2W=(atomic operation I2W)|(atomic operation O2W)

the deducing result of the target operation X2W is met, if the distributed attribute of the input tensor and the distributed attribute of the output tensor conform to a distributed attribute deducing result of any one of the atomic operation I2W and the atomic operation O2W. The target operation obtained by the OR ("|") mode is a parallel relationship of a plurality of atomic operations. FIG. 9 shows a process of constructing the target operation X2B by utilizing the composition operation of the OR ("|"), wherein X represents any one distributed attribute, the X may be replaced with other distributed attributes, W represents a certain specified distributed attribute, I represents an input distributed attribute, O represents an output distributed attribute, 2 represents a process of conversion between the distributed attributes, and X2W represents conversion of the distributed attribute X into the distributed attribute W. A process of constructing the target operation X2B of converting the any distributed attribute into the broadcast attribute is as follows: as long as a distributed attribute deducing result of any one of the following atomic operations B2B, P2B and S2B is met, the deducing result of the distributed attribute of the target operation X2B is satisfied.

Figure 10:
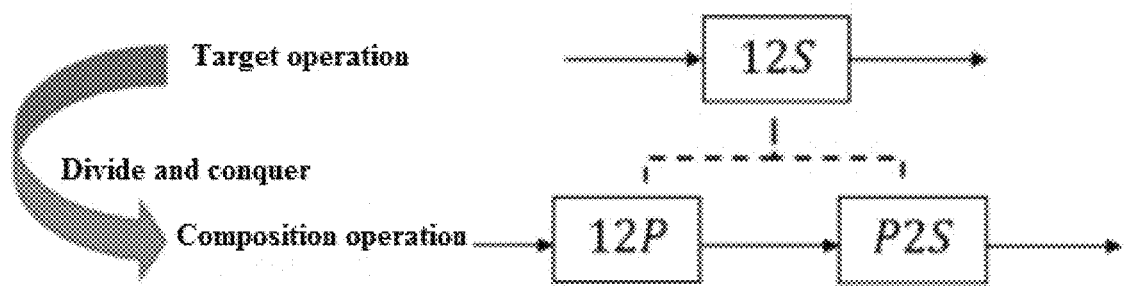
FIG. 10 is a process of constructing a complex operation 12S by using a divide and conquer mode.

(2) the complex operation is constructed by utilizing a divide and conquer mode, and the divide and conquer mode is defined as follows:

target operation I2O=divide and conquer (atomic operation I2M, atomic operation M2O)

the target operation I2O may be in series with the two atomic operations I2M and M2O by using the distributed attribute M in an intermediate state. If the distributed attribute I of the input tensor and the intermediate distributed attribute M conform to a distributed attribute deducing result of the atomic operation I2M, moreover, the intermediate distributed attribute M and the distributed attribute O of the output tensor conform to a distributed attribute deducing result of the atomic operation M2O, then the deducing result of the distributed attribute of the target operation I2O is satisfied, wherein I represents an input distributed attribute, O represents an output distributed attribute, and 2 represents a process of conversion between the distributed attributes. The divide and conquer mode is a series relationship of the plurality of atomic operations by means of the intermediate distributed attribute. FIG. 10 shows a process of constructing the complex operation I2S by using the divide and conquer mode.

Figure 11:
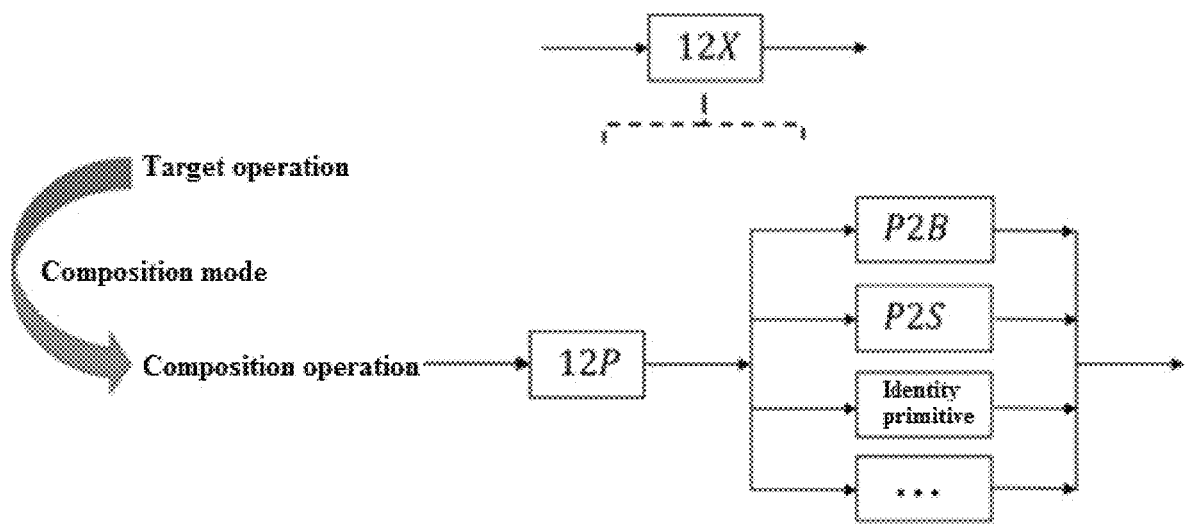
FIG. 11 is a process of constructing a complex operation 12X by using a composition mode.

(3) the complex operation is constructed by using a composition mode. The composition mode refers to constructing a more complex target operation by combined use of series and parallel modes. FIG. 11 shows a process of constructing the complex operation I2X by utilizing the composition mode.

The step S7 of inserting the intermediate communication primitive with the minimum transmission cost includes the following processes: acquiring routing operations of different deducing distributed attributes by utilizing the method for deducing the distributed attribute of the local physical tensor, selecting the operation with the minimum communication cost from the routing operations as a final routing modeling method for deducing the required distributed attribute of the local physical tensor, and finally inserting the intermediate communication primitive corresponding to the selected method into a space between the global logic tensor and the local physical tensor.

Figure 12:
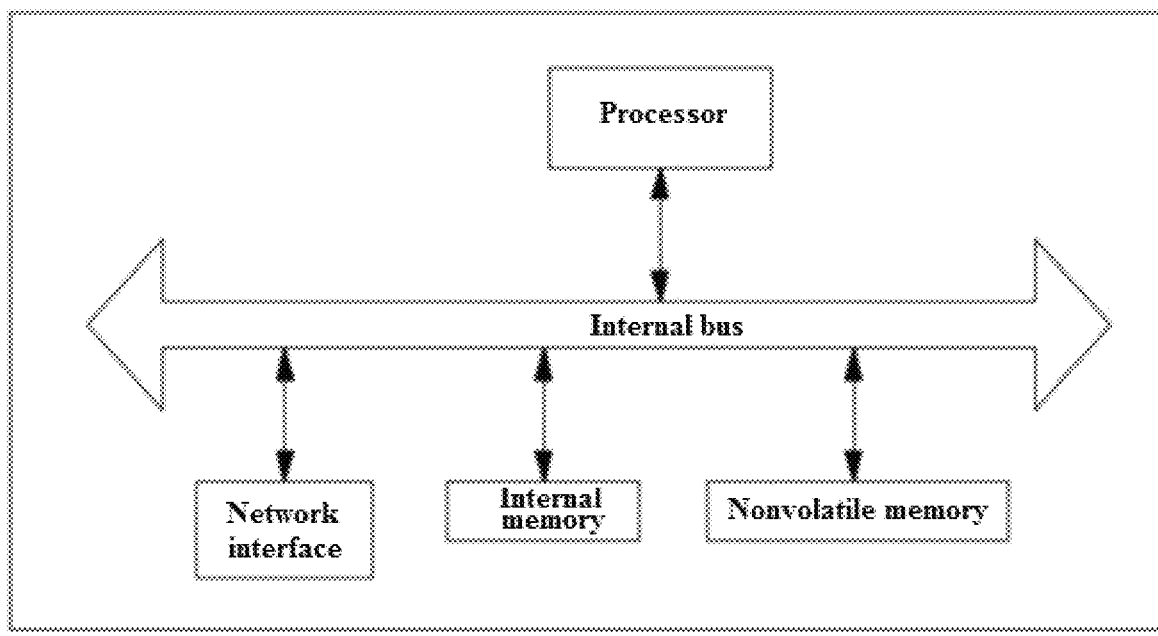
FIG. 12 is a schematic diagram of an apparatus of an embodiment of the present disclosure.

Referring to FIG. 12, an embodiment of the present disclosure further provides a modeling apparatus oriented neural network computation for distributed data routing, and the modeling apparatus further includes a memory and one or more processors, the memory stores an executable code, and the one or more processors, when executing the executable code, is used for implementing the modeling method oriented neural network computation for distributed data routing in the embodiment.

The embodiment of the modeling apparatus oriented neural network computation for distributed data routing may be applied to any device with data processing capability, and the device with the data processing capability may be a device or an apparatus such as a computer. The apparatus embodiment may be implemented by software, and may also be implemented by hardware or a mode of combining software and hardware. For example, the embodiment of the apparatus is implemented by software, the apparatus in a logical sense is formed by reading corresponding computer program instructions in a nonvolatile memory into an internal memory for running by a processor of any device with data processing capability where it is located. In terms of hardware, FIG. 12 is a hardware structure diagram of any device with data processing capability where the modeling apparatus oriented neural network computation-oriented for distributed data routing is located. Besides the processor, the internal memory, a network interface and a nonvolatile memory shown in FIG. 12, any device with data processing capability where the apparatus in the embodiment is located may also include other hardware according to the actual function of the any device with data processing capability, which will not be described again. The specific details of the implementation process of the functions and actions of each unit in the above-mentioned apparatus may refer to the implementation processes of the corresponding steps in the above-mentioned method, and will not be described herein again.

With regard to the apparatus embodiment, since it basically corresponds to the method embodiment, reference may be made to the partial description of the method embodiment for relevant points. The above-described apparatus embodiment is merely illustrative, and the units described as separate components may or may not be physically separate, and components displayed as units may or may not be physical units, may be located in one position, or may be distributed over multiple network units. Some or all of the modules can be selected according to actual needs to achieve the purpose of the solution of the present disclosure. One of ordinary skill in the art can understand and implement without inventive effort.

An embodiment of the present disclosure further provides a computer readable storage medium, which stores a program, and when executed by the processor, the program implements the neural network computing-oriented modeling method for distributed data routing in the embodiment.

The computer readable storage medium may be an internal storage unit, such as a hard disk or a memory, of any device with data processing capability described in any previous embodiment. The computer readable storage medium may also be an external storage device of any device with data processing capability, such as a plug-in hard disk, a smart media card (SMC), an SD card and a flash card which are arranged on the device. Further, the computer readable storage medium may include both an internal storage unit and an external storage device of any device with data processing capability. The computer readable storage medium is used for storing the computer program and other programs and data which are required by the any device with data processing capability, and may also be used for temporarily storing data which has been output or is about to be output.

The above described embodiments are only the preferred embodiments of the present disclosure and are not intended to limit the present disclosure, and all modifications, equivalent replacements or improvements made within the spirit and principle of the present disclosure should be included within the scope of protection of the present disclosure.

What is claimed is:

1. A neural network computing-oriented compiling method comprising:
   on a processor, specifying a distributed attribute of an input tensor of a producer operator, and then deducing a legal distributed attribute of an output tensor of the producer operator according to the distributed attribute of the input tensor;
   determining whether an intermediate communication primitive is required to be inserted to obtain a distributed attribute of a local physical tensor;
   in response to the intermediate communication primitive being required to be inserted, deducing a type of the intermediate communication primitive according to the distributed attribute of the output tensor of the producer operator and a distributed attribute of an input tensor of a consumer operator;
   in response to the intermediate communication primitive being required to be inserted, deducing transmission cost of the intermediate communication primitive according to communication cost of conversion between the distributed attribute of the output tensor of the producer operator and the distributed attribute of the input tensor of the consumer operator;
   deducing a modeling mode of the intermediate communication primitive, by:
      defining basic atomic operations;
      constructing a complex operation using the basic atomic operations;

wherein the complex operation is constructed by using (1) an OR mode, and the complex operation is a parallel relationship of a plurality of atomic operations; (2) a divide and conquer mode, and the complex operation is a serial relationship of a plurality of atomic operations by an intermediate distributed attribute; or both;

inserting the intermediate communication primitive with a smallest transmission cost into a space between a global logic tensor and the local physical tensor;

executing, on the processor, compiling and deploying the global logic tensor to local physical tensors of different device processes.

2. The neural network computing-oriented compiling method according to claim 1, further comprising, before specifying the distributed attribute of the input tensor of the producer operator, abstracting a mapping relationship between a logic tensor and a physical tensor into a broadcast attribute, a scatter attribute and a local reduction attribute.

3. The neural network computing-oriented compiling method according to claim 1, wherein determining whether the intermediate communication primitive is required to be inserted comprises determining whether the distributed attribute of the output tensor of the producer operator and the distributed attribute of the input tensor of the consumer operator are different.

4. The neural network computing-oriented compiling method according to claim 2, wherein deducing the transmission cost comprises:

deducing communication cost of conversion of the scatter attribute into any distributed attribute, the communication cost comprising:

communication cost of conversion between the scatter attribute $S(0)$ and the scatter attribute $S(1)$ wherein conversion between the scatter attribute $S(0)$ and the scatter attribute $S(1)$ is realized by means of an intermediate communication primitive All2All, and a transmission data volume generated during the conversion is the size of the global logic tensor;

communication cost of conversion of the scatter attribute into the broadcast attribute, wherein the scatter attribute is converted into the broadcast attribute by means of an intermediate communication primitive AllGather, and the communication cost is a product of a number of device processes of the output tensor and the size of the global logic tensor;

deducing communication cost of conversion of the local reduction attribute into any distributed attribute, the communication cost comprising:

communication cost of conversion of the local reduction attribute into the scatter attribute, wherein the local reduction attribute is converted into the scatter attribute by means of an intermediate communication primitive ReduceScatter, and the communication cost is the product of a number of device processes of the input tensor and the size of the global logic tensor; and communication cost of conversion of the local reduction attribute into the broadcast attribute, wherein the local reduction attribute is converted into the broadcast attribute by means of an intermediate communication primitive AllReduce, the communication cost is $(p_1-1+p_2)*|T|$, wherein $p_1$ is the number of device processes containing the input tensor, $|T|$ is the size of a logic tensor T, and $p_2$ is the number of device processes containing the output tensor.

5. The neural network computing-oriented compiling method according to claim 1, wherein the transmission cost of the intermediate communication primitive is 0.

6. The neural network computing-oriented compiling method according to claim 2, wherein constructing the complex operation comprises:

defining an atomic operation of conversion between the scatter attribute $S(0)$ and the scatter attribute $S(1)$ as a communication primitive All2All;

defining an atomic operation of conversion of the scatter attribute into the broadcast attribute as a communication primitive AllGather;

defining an atomic operation of conversion of the local reduction attribute into the scatter attribute as a communication primitive ReduceScatter;

defining an atomic operation of conversion of the local reduction attribute into the broadcast attribute as a communication primitive AllReduce;

defining an atomic operation of conversion of a distributed attribute X into the same distributed attribute X as Identity, wherein the operation of Identity is a copy operation which represents copying of the input tensor to the output tensor; and defining an atomic operation of deploying the global logic tensor into a 12P local physical distributed relationship: deploying the global logic tensor into different device processes, wherein the physical tensor contained in one device process is a copy of the global logic tensor, and the other device processes only contain physical tensors of which the shapes are consistent with the shape of the global logic tensor and numerical values are all set to zero.

7. The neural network computing-oriented compiling method according to claim 1, wherein using the OR mode comprises:

complex operation $X2W$=(atomic operation $I2W$)| (atomic operation $O2W$);

wherein a deducing result of the complex operation X2W is met under the condition that the distributed attribute of the input tensor and the distributed attribute of the output tensor conform to a distributed attribute deducing result of any one of the atomic operation I2W and the atomic operation O2W; wherein X represents any distributed attribute, W represents a certain specified distributed attribute, I represents an input distributed attribute, O represents an output distributed attribute, 2 represents a process of conversion between distributed attributes, and X2W represents conversion of the distributed attribute X into the distributed attribute W.

8. The neural network computing-oriented compiling method according to claim 1, wherein using the divide and conquer mode comprises:

complex operation I2O=divide and conquer (atomic operation I2W, atomic operation M2O);

wherein the complex operation I2O is the two atomic operations I2M and M2O serialized by using a distributed attribute M in an intermediate state, under the condition that the distributed attribute I of the input tensor and the intermediate distributed attribute M conform to a distributed attribute deducing result of the atomic operation I2M, and the intermediate distributed attribute M and the distributed attribute O of the output tensor conform to a distributed attribute deducing result of the atomic operation M2O, then the deducing result of the distributed attribute of the complex operation I2O is met; wherein I represents an input distributed attribute, O represents an output distributed attribute, and 2 represents a process of conversion between the distributed attributes.

9. The neural network computing-oriented compiling method according to claim 1, wherein inserting the intermediate communication primitive with the smallest transmission cost comprises: acquiring routing operations of different deducing distributed attributes based on the above-mentioned steps, selecting the operation with the minimum communication cost from all the routing operations as a final routing modeling method for deducing the required distributed attribute of the local physical tensor, and finally inserting the intermediate communication primitive corresponding to the selected method into a space between the global logic tensor and the local physical tensor.

10. An apparatus comprising a non-memory with an executable code stored therein and one or more processors, wherein and the one or more processors, when executing the executable code, implement the neural network computing-oriented compiling method according to claim 1.

\* \* \* \* \*